United States Patent
Ruan et al.

(10) Patent No.: US 10,817,237 B2
(45) Date of Patent: Oct. 27, 2020

(54) MOBILE TERMINAL CONFIGURED TO DISPLAY SCREEN IN ACCORDANCE WITH INSTRUCTION INFORMATION OBTAIN FROM COMMUNICATION DEVICE

(71) Applicant: Brother Kogyo Kabushiki Kaisha, Nagoya-shi, Aichi-ken (JP)

(72) Inventors: Longlong Ruan, Nagoya (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/456,632

(22) Filed: Jun. 28, 2019

(65) Prior Publication Data
US 2020/0004483 A1 Jan. 2, 2020

(30) Foreign Application Priority Data
Jun. 29, 2018 (JP) .................. 2018-123882

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1292* (2013.01); *G06F 3/1205* (2013.01); *G06F 3/1253* (2013.01); *H04N 1/00456* (2013.01); *H04N 1/00779* (2013.01)

(58) Field of Classification Search
CPC ............ H04N 1/00456; H04N 1/00779; G06F 3/1292; G06F 3/1205; G06F 3/1253

USPC ................... 358/1.1, 1.15, 1.14, 1.13
See application file for complete search history.

(56) References Cited

U.S. PATENT DOCUMENTS

| 8,111,418 B2 | 2/2012 | Hosono et al. |
| 9,414,185 B2 | 8/2016 | Kurihara |
| 2010/0214604 A1 | 8/2010 | Hosono et al. |
| 2014/0226181 A1* | 8/2014 | Shibukawa ........ H04N 1/00127 358/1.15 |

(Continued)

FOREIGN PATENT DOCUMENTS

| JP | 2010-199642 A | 9/2010 |
| JP | 2014-075622 A | 4/2014 |
| JP | 2015-186104 A | 10/2015 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Douglas Q Tran
(74) *Attorney, Agent, or Firm* — Banner & Witcoff, Ltd.

(57) ABSTRACT

A mobile terminal may obtain instruction information from a communication device in a situation where a first screen is displayed on a display of the mobile terminal, the instruction information indicating an instruction for causing the display to display a different screen from the first screen; obtain state information indicating a current state of the mobile terminal in a case where the instruction information is obtained; determine, by using the state information, whether the different screen is to be displayed in place of the first screen; and in a case where it is determined that the different screen is to be displayed, cause the display to display the different screen in place of the first screen.

10 Claims, 9 Drawing Sheets

(56) References Cited

U.S. PATENT DOCUMENTS

| | | | |
|---|---|---|---|
| 2015/0163369 A1* | 6/2015 | Komaba | ............ H04N 1/00469 |
| | | | 358/1.15 |
| 2015/0281876 A1 | 10/2015 | Kurihara | |
| 2016/0316083 A1 | 10/2016 | Kurihara | |
| 2018/0027135 A1 | 1/2018 | Kurihara | |

* cited by examiner (Specific Examples of Second Screen Process)

MOBILE TERMINAL CONFIGURED TO DISPLAY SCREEN IN ACCORDANCE WITH INSTRUCTION INFORMATION OBTAIN FROM COMMUNICATION DEVICE

CROSS-REFERENCE TO RELATED APPLICATION

This application claims priority to Japanese Patent Application No. 2018-123882 filed on Jun. 29, 2018, the contents of which are hereby incorporated by reference into the present application.

TECHNICAL FIELD

The disclosure herein discloses a technique relating to a mobile terminal configured to display a screen in accordance with instruction information obtained from a communication device.

DESCRIPTION OF RELATED ART

A mobile terminal capable of communicating with an MFP is known. In a case of establishing a communication session with an NFC tag of the MFP, the mobile terminal obtains a parameter from the NFC tag. The mobile terminal transitions a screen to be displayed on a touch screen display to a screen in accordance with the obtained parameter.

SUMMARY

In the above technique, a state of the mobile terminal is not considered. For this reason, in response to the mobile terminal obtaining the parameter from the NFC tag, a screen which is not compatible with the state of the mobile terminal may be displayed. The present disclosure provides a technique capable of suppressing display of a screen that is not compatible with a state of a mobile terminal, in a case where instruction information is obtained from a communication device.

A non-transitory computer-readable medium storing computer-readable instructions for a mobile terminal is disclosed herein. The computer-readable instructions, when executed by a processor of the mobile terminal, may cause the mobile terminal to: obtain instruction information from a communication device in a situation where a first screen is displayed on a display of the mobile terminal, the instruction information indicating an instruction for causing the display to display a different screen from the first screen; obtain state information indicating a current state of the mobile terminal in a case where the instruction information is obtained; determine, by using the state information, whether the different screen is to be displayed in place of the first screen; and in a case where it is determined that the different screen is to be displayed, cause the display to display the different screen in place of the first screen, wherein in a case where it is determined that the different screen is not to be displayed, displaying of the first screen is maintained.

The above mobile terminal itself and a method implemented by the above mobile terminal are also novel and useful.

EMBODIMENTS

Figure 1:
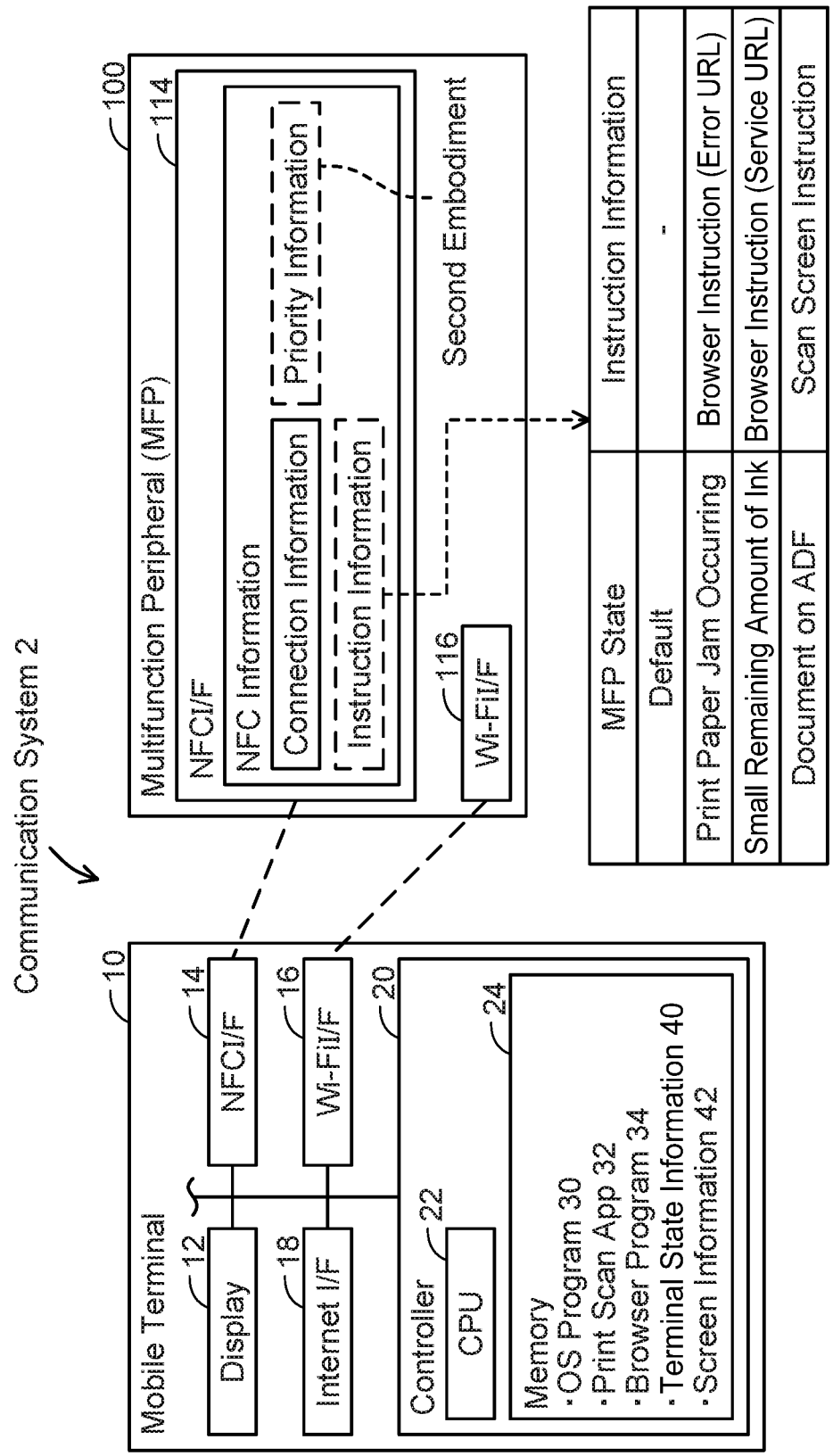
FIG. 1 shows a configuration of a communication system.

First Embodiment (Configuration of Communication System 2; FIG. 1)

As shown in FIG. 1, a communication system 2 comprises a mobile terminal 10 and a multifunction peripheral 100. The devices 10, 100 are capable of executing wireless communication according to an NFC (abbreviation of Near Field Communication) scheme (i.e., a type of so-called short distance wireless communication) and wireless communication according to a Wi-Fi scheme. Hereinbelow, "multifunction peripheral" may be referred to as "MFP (abbreviation of Multifunction Peripheral)".

(Configuration of MFP 100)

The MFP 100 is a peripheral device (i.e., a peripheral device of the mobile terminal 10) capable of executing multiple functions including a print function and a scan function. The MFP 100 comprises an NFC interface 114 and a Wi-Fi interface 116. Hereinbelow, an interface may be referred to as "I/F".

The Wi-Fi I/F 116 is an I/F for executing wireless communication according to the Wi-Fi scheme. The Wi-Fi scheme is a wireless communication scheme for executing wireless communication in accordance with, for example, IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 116 especially supports a WFD (abbreviation of Wi-Fi Direct (registered trademark)) scheme formulated by the Wi-Fi Alliance. The WFD scheme is a wireless communication scheme described in a standard document "Wi-Fi Peer-to-Peer (P2P) Technical Specification Version 1.1" created by the Wi-Fi Alliance.

The MFP 100 can operate in any of a G/O (abbreviation of Group Owner) state, a CL (abbreviation of Client) state, and a device state of the WFD scheme. The MFP 100 is capable of forming a Wi-Fi network to which the MFP 100 and an external device (e.g., the mobile terminal 10) belong by operating as a G/O of the WFD scheme. In this case, the MFP 100 can cause the external device to participate in the Wi-Fi network as a child station. In a variant, the MFP 100 may form a network to which the MFP 100 and the external device belong by operating as a Soft AP.

The NFC I/F 114 is an I/F for executing wireless communication according to the NFC scheme. The NFC scheme is a wireless communication scheme based on an international standard, such as, ISO/IEC 21481 or 18092. The NFC I/F 114 is an NFC forum tag. The NFC forum tag is an interface that functions as an IC (abbreviation of Integrated Circuit) tag in accordance with the NFC scheme. In a case of receiving a polling signal from an external device (e.g., the mobile terminal 10), the NFC I/F 114 sends a response signal for the polling signal to the external device and establishes an NFC connection with the external device.

The NFC I/F 114 stores NFC information. The NFC information includes connection information. The connection information is information for causing an external device to participate in the Wi-Fi network in which the MFP 100 operates as a parent station, and includes an SSID (abbreviation of Service Set IDentifier) for identifying the Wi-Fi network and a password. The SSID and the password are generated by the MFP 100 and stored in the NFC I/F 114.

Further, the NFC information may include instruction information. The instruction information is information indicating an instruction for causing a display (e.g., a display 12) of the mobile terminal to display a specific screen. The instruction information is stored in the NFC I/F 114 in case where at least one specific signal is obtained from sensors (not shown) of the MFP 100. The aforementioned sensors include, for example, a paper jam sensor for detecting presence or absence of a printing paper jam, a remaining amount sensor for detecting a remaining amount in a consumable article (a toner, ink, etc.) used for printing, an ADF (abbreviation of Auto Document Feeder) sensor for detecting whether or not a document is placed on an ADF of the MFP 100, and the like. The ADF is a device configured to scan a document to be scanned while feeding the document. Further, the instruction information is not stored in the NFC I/F 114 in a case where none of the specific signal is obtained from the sensors, for example, in a case where the MFP 100 is in a default state where no error or the like is occurring.

For example, in a case of obtaining a signal indicating that a printing paper jam has occurred from the paper jam sensor, the MFP 100 stores a browser instruction including an error URL (abbreviation of Uniform Resource Locator) in the NFC I/F 114 as the instruction information. The browser instruction is a command for instructing the mobile terminal to activate a browser program and to access a server according to the URL included in the browser instruction. The error URL indicates a location of a support server (not shown) installed on the Internet. The support server stores a web page indicating a solution for the printing paper jam. In a case of obtaining a signal indicating that the printing paper jam has been solved from the paper jam sensor, the MFP 100 deletes the browser instruction (i.e., the instruction information) from the NFC I/F 114.

For example, in a case of obtaining a signal indicating that a remaining amount of toner is equal to or below a predetermined amount from the remaining amount sensor, the MFP 100 stores a browser instruction including a service URL in the NFC I/F 114 as the instruction information. The service URL indicates a location of a service server (not shown) installed on the Internet. The service server provides a service of receiving an order of the toner from a user and stores a web page for the service. In a case of obtaining a signal indicating that the remaining amount of toner is larger than the predetermined amount from the remaining amount sensor, the MFP 100 deletes the browser instruction from the NFC I/F 114.

For example, in a case of obtaining a signal indicating that a document has been placed on the ADF from the ADF sensor, the MFP 100 stores a scan screen instruction in the NFC I/F 114 as the instruction information. The scan screen instruction is a command for causing the mobile terminal 10 to display a scan setting screen SC13 to be described later (see FIG. 3). The scan screen instruction includes size information indicating document size(s) (e.g., A4, A5) that the ADF is capable of feeding. In a case of obtaining from the ADF sensor a signal indicating that no document is being placed on the ADF due to the document having been removed from the ADF, the MFP 100 deletes the scan screen instruction from the NFC I/F 114.

Here, differences between a Wi-Fi I/F and an NFC I/F will be described. A communication speed of wireless communication via a Wi-Fi I/F (e.g., maximum communication speed is 11 to 600 Mbps) is faster than a communication speed of wireless communication via an NFC I/F (e.g., maximum communication speed is 100 to 424 Kbps). Further, a frequency used for wireless communication via the Wi-Fi I/F (e.g. a 2.4 GHz band or 5.0 GHz band) is different from a frequency used for wireless communication via the NFC I/F (e.g. a 13.56 MHz band). Further, a maximum distance with which wireless communication via the Wi-Fi I/F can be executed (e.g., about 100 m at maximum) is greater than a maximum distance with which wireless communication via the NFC I/F can be executed (e.g., about 10 cm at maximum).

(Configuration of Mobile Terminal 10)

The mobile terminal 10 is a portable terminal such as a mobile phone, a smartphone, a tablet PC, or the like. The mobile terminal 10 comprises the display 12, an NFC I/F 14, a Wi-Fi I/F 16, an Internet I/F 18, and a controller 20. The s 12 to 20 are connected to a bus line (reference number omitted).

The display 12 is a display configured to display various types of information. The display 12 functions as a so-called touch panel. That is, the display 12 also functions as an operation operated by a user.

The NFC I/F 14 is an I/F for executing NFC communication in accordance with the NFC scheme and is an NFC forum device. The NFC forum device is an I/F capable of selectively operating in any of a P2P (abbreviation of Peer To Peer) mode, an R/W (abbreviation of Reader/Writer) mode, and a CE (abbreviation of Card Emulation) mode. The NFC I/F 14 is capable of operating in at least the R/W mode. In a case of operating in the Reader mode, the NFC I/F 14 can read out the NFC information from the NFC I/F 114 of the MFP 100, that is, can receive the NFC information from the NFC I/F 114. In a case of operating in the Writer mode, the NFC I/F 14 can write information into the NFC I/F 114, that is, can send information to the NFC I/F 114. The Wi-Fi I/F 16 is the same as the Wi-Fi I/F 116 of the MFP 100.

The Internet I/F 18 is an I/F for connecting to the Internet via a mobile network formed by base station(s). The mobile network is a wireless network according to a cellular scheme (e.g., 3G (abbreviation of 3rd Generation) scheme, a 4G (abbreviation of 4th Generation) scheme, an LTE (abbreviation of Long Term Evolution) scheme, etc.).

The controller 20 comprises a CPU 22 and a memory 24. The CPU 22 is configured to execute various processes in accordance with programs 30 to 34 stored in the memory 24. The memory 24 is constituted of a volatile memory, a non-volatile memory, and the like. The memory 24 stores an OS (abbreviation of Operating System) program 30 for realizing basic processes, a print scan application program (called "print scan app" below) 32, and a web browser program 34. The OS program 30 is, for example, Android (registered trademark). The web browser program 34 is, for example, chrome (registered trademark), firefox (registered trademark), or the like.

The print scan app 32 is a program provided by a vendor of the MFP 100 and is a program for sending, to the MFP 100, an execution request for causing the MFP 100 to execute printing or scanning. The print scan app 32 may be installed to the mobile terminal 10 from a server (not shown)

on the Internet provided by the vendor, or may be installed to the mobile terminal 10 from media shipped together with the MFP 100, for example.

Moreover, the memory 24 further stores terminal state information 40 and screen information 42. The terminal state information 40 is information indicating a state of the mobile terminal 10. The terminal state information 40 is stored in a predetermined area of the memory 24 according to the OS program 30. The terminal state information 40 includes, for example, battery remaining amount information indicating a remaining amount of the battery of the mobile terminal 10, available memory information indicating an available storage capacity of the memory 24 that is left, communication state information indicating a state of the Internet I/F 18, and country information. In accordance with an operation of the user, the state of the Internet I/F 18 is set to one of a communicable state, in which communication via the Internet is possible and an incommunicable state, in which communication via the Internet is not possible. The communication state information indicates that communication via the Internet can be executed in a case where the state of the Internet I/F 18 is the communicable state, whereas it indicates that communication via the Internet cannot be executed in a case where the state of the Internet I/F 18 is the incommunicable state. Further, the country information is information indicating a country in which the user of the mobile terminal 10 lives. The country information is inputted to the mobile terminal 10 by the user.

The screen information 42 is information for specifying a type of screen displayed on the display 12 in accordance with the print scan app 32. The screen information 42 is stored in a predetermined area of the memory 24 in accordance with the print scan app 32. For example, in a case where the CPU 22 causes the display 12 to display a home screen SC1 (see FIG. 3) in accordance with the print scan app 32, the CPU 22 stores the screen information 42 for specifying the home screen SC1 in the predetermined area of the memory 24.

Figure 2:
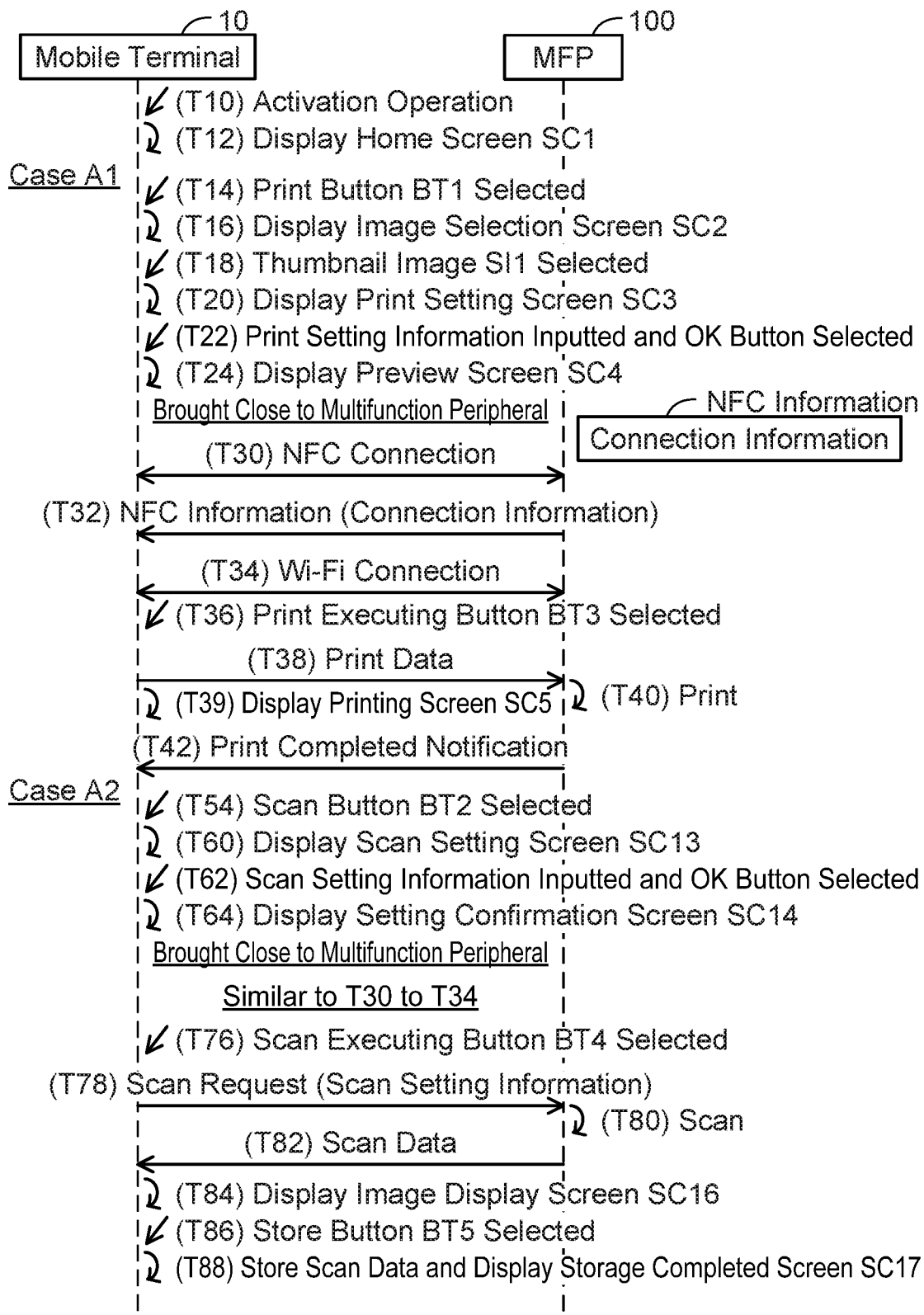
FIG. 2 shows an outline for execution of printing and scanning.
Figure 3:
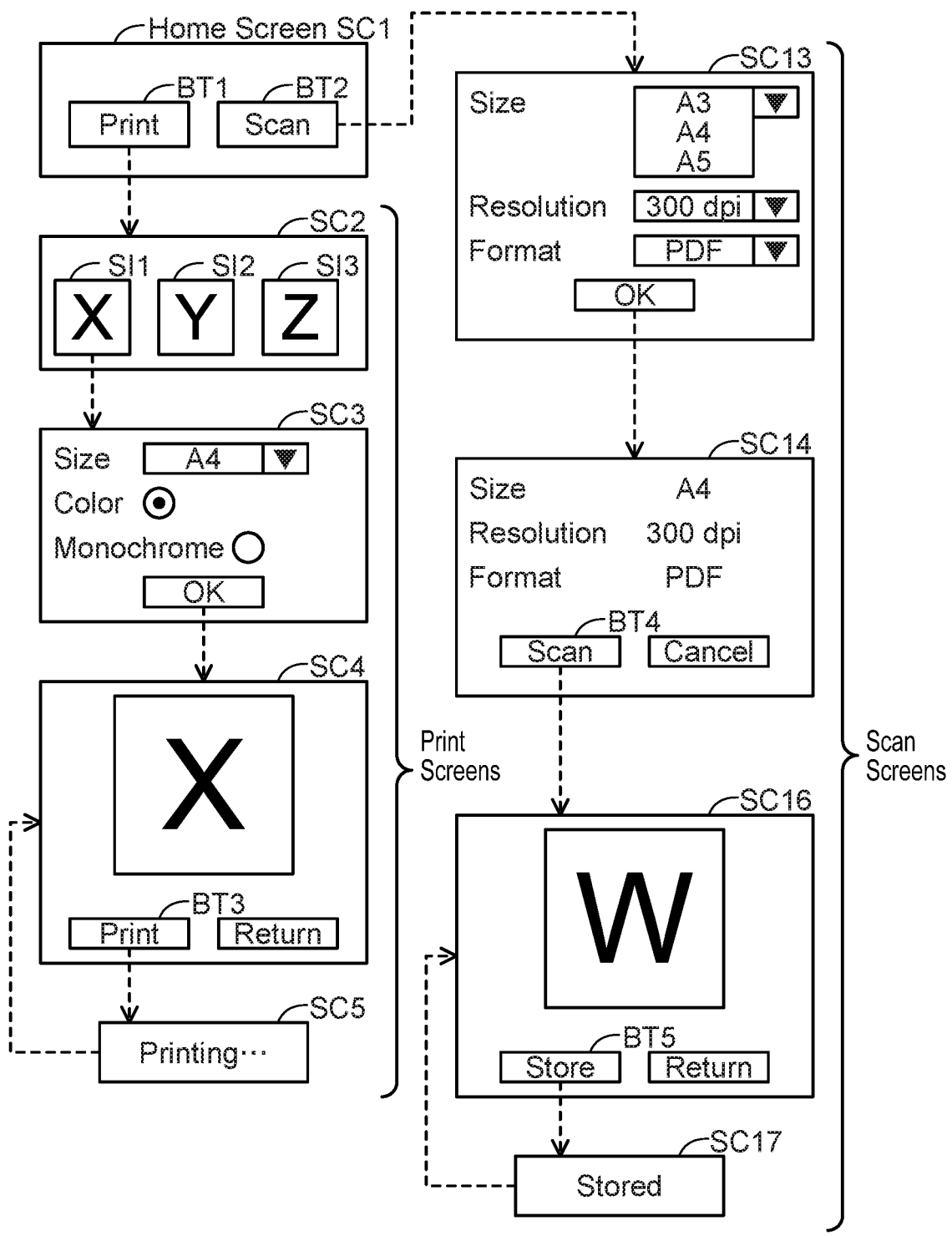
FIG. 3 shows screens displayed by a mobile terminal.

(Outline for Execution of Printing and Scanning; FIG. 2, FIG. 3)

An outline of processes in which the mobile terminal 10 causes the MFP 100 to execute printing and scanning will be described with reference to FIG. 2 and FIG. 3. Hereinbelow, to facilitate understanding, processes executed by the CPU 22 of the mobile terminal 10 in accordance with the print scan app 32 may be described with the mobile terminal 10 as the subject of action, not with the CPU 22 as the subject of action. Further, in the present case, the MFP 100 is in the default state. Therefore, the NFC information includes the connection information but does not include any instruction information.

In T10, the user performs an operation for activating the print scan app 32 on the mobile terminal 10, as a result of which the print scan app 32 is activated. In T12, the mobile terminal 10 causes the display 12 to display the home screen SC1. As shown in FIG. 3, the home screen SC1 includes a print button BT1 for accepting an instruction to use the print function of the MFP 100 and a scan button BT2 for accepting an instruction to use the scan function of the MFP 100.

(Case A1)

In case A1, in T14 the mobile terminal 10 accepts selection of the print button BT1. In T16, the mobile terminal 10 causes the display 12 to display an image selection screen SC2. The image selection screen SC2 is a screen for selecting image data that represents an image to be printed by the MFP 100. As shown in FIG. 3, the image selection screen SC2 includes a plurality of thumbnail images SI1 to SI3 represented by a plurality of image data stored in the memory 24. In T18, the mobile terminal 10 accepts from the user selection of the thumbnail image SI1 from among the plurality of thumbnail images SI1 to SI3.

In T20, the mobile terminal 10 causes the display 12 to display a print setting screen SC3. The print setting screen SC3 is a screen for inputting setting information for executing the print function. As shown in FIG. 3, the print setting screen SC3 includes an input field and an OK button. The input field is a field for inputting a plurality of print setting values (e.g., paper size "A4", color/monochrome "color") corresponding to a plurality of setting items (e.g., paper size, color/monochrome) for executing the print function. The OK button is a button selected by the user when input of the print setting values has been completed. In T22, the mobile terminal 10 accepts from the user input of print setting information (i.e., the plurality of print setting values) and selection of the OK button.

In T24, the mobile terminal 10 causes the display 12 to display a preview screen SC4 including a preview image (see FIG. 3). Specifically, the mobile terminal 10 converts the image data corresponding to the thumbnail image SI1 selected in T18 according to the print setting information inputted in the print setting screen SC3 to generate preview image information representing an image to be printed by the MFP 100. Then, the print scan app 32 causes the display 12 to display the preview screen SC4 including the preview image represented by the generated preview image information. Further, the preview screen SC4 includes a print execution button BT3 and a Return button. The print execution button BT3 is a button for accepting an instruction to send print data to the MFP 100. The Return button is a button for returning to the home screen SC1.

In the present case, the user brings the mobile terminal 10 close to the MFP 100 in a situation where the preview screen SC4 is being displayed in the display 12. Thereby, a distance between the NFC I/F 14 of the mobile terminal 10 and the NFC I/F 114 of the MFP 100 becomes equal to or shorter than a predetermined distance (e.g., 10 cm), a polling signal is sent from the NFC I/F 14 to the NFC I/F 114, a response signal for the polling signal is sent from the NFC I/F 114 to the NFC I/F 14. As a result, in T30, an NFC connection is established between the mobile terminal 10 and the MFP 100.

In T32, the mobile terminal 10 causes the NFC I/F 14 to operate in the Reader mode and receives the NFC information from the NFC I/F 114 of the MFP 100 by using the NFC connection. As described above, in the present case, the NFC information includes the connection information but does not include any instruction information.

In T34, the mobile terminal 10 establishes a Wi-Fi connection with the MFP 100 by using the connection information included in the received NFC information. Specifically, the mobile terminal 10 executes communication of various signals for establishing a Wi-Fi connection (e.g., Authentication signal, Association signal, 4-way handshake, etc.) with the MFP 100 via the Wi-Fi I/F 16. During the communication of the various signals, the password in the connection information is sent to the MFP 100 and the MFP 100 executes authentication of the password. As a result, the mobile terminal 10 establishes a Wi-Fi connection with the MFP 100 via the Wi-Fi I/F 16.

In T36, the mobile terminal 10 accepts from the user selection of the print execution button BT3 in the preview screen SC4. In T38, the mobile terminal 10 converts the image data corresponding to the thumbnail image SI1 selected in T18 in accordance with the setting information inputted in T22 to generate print data. The print data includes converted image data having a data format that can be interpreted by the MFP 100 and the print setting information inputted in T22. Then, the mobile terminal 10 sends the generated print data to the MFP 100 via the Wi-Fi I/F 16 by using Wi-Fi connection established in T34. Further, in T39, the mobile terminal 10 displays a printing screen SC5 indicating that the MFP 100 is executing printing.

Upon receiving the print data from the mobile terminal 10 in T38, in T40 the MFP 100 executes printing of the image represented by the image data included in the print data in accordance with the print setting information included in the print data. Upon completion of the printing, in T42 the MFP 100 sends to the mobile terminal 10 a printing completed notification indicating that the printing has been completed.

Upon receiving the printing completed notification from the MFP 100 in T42, the mobile terminal 10 deletes the printing screen SC5 and displays the preview screen SC4.

(Case A2)

In case A2, in T54 the mobile terminal 10 accepts selection of the scan button BT2 in the home screen SC1. In T60, the mobile terminal 10 causes the display 12 to display the scan setting screen SC13. As shown in FIG. 3, the scan setting screen SC13 includes an input field and an OK button. The input field is a field for inputting a plurality of scan setting values (e.g., document size "A4", resolution "300 dpi", data format "PDF") corresponding to a plurality of setting items (e.g., document size, resolution, data format) for executing the scan function. The OK button is a button selected by the user when input of the scan setting values has been completed. In T62, the mobile terminal 10 accepts from the user input of scan setting information (i.e., the plurality of scan setting values) and selection of the OK button.

In T64, the mobile terminal 10 causes the display 12 to display a setting confirmation screen SC14 (see FIG. 3). The setting confirmation screen SC14 is a screen for confirming the contents of the scan setting information inputted to the scan setting screen SC13. The setting confirmation screen SC14 includes a scan execution button BT4 and a Cancel button. The scan execution button BT4 is a button for accepting an instruction to send a scan request for requesting execution of scanning to the MFP 100.

In the present case, the user brings the mobile terminal 10 close to the MFP 100 in a situation where the setting confirmation screen SC14 is being displayed on the display 12. Thereby, the same processes as T30 to T34 are executed.

In T76, the mobile terminal 10 accepts selection of the scan execution button BT4 in the setting confirmation screen SC14 from the user. In T78, the mobile terminal 10 sends a scan request including the scan setting information inputted in T62 to the MFP 100 via the Wi-Fi I/F 16 by using the Wi-Fi connection established in T34.

Upon receiving the scan request from the mobile terminal 10 in T78, in T80 the MFP 100 executes scanning of a document placed on the MFP 100 in accordance with the scan setting information included in the scan request to generate scan data. In T82, the MFP 100 sends the generated scan data to the mobile terminal 10 by using the Wi-Fi connection.

Upon receiving the scan data from the MFP 100 in T82, the mobile terminal 10 causes in T84 the display 12 to display an image display screen SC16 including an image represented by the scan data. The image display screen SC16 includes a Store button BT5 and a Return button. The Store button BT5 is a button for storing the received scan data in a specific area of the memory 24. In a variant, the Store button BT5 may be a button for storing the received scan data in a device provided separately from the mobile terminal 10, for example, a server on the Internet.

In T86, the mobile terminal 10 accepts selection of the Store button BT5 in the image display screen SC16 from the user. In T88, the mobile terminal 10 stores the received scan data in the specific area of the memory 24. Then, upon completion of the storage of the scan data, the mobile terminal 10 causes the display 12 to display a storage completed screen SC17 indicating that the storage of the scan data has been completed. When a predetermined period of time has elapsed since the start of display of the storage completed screen SC17, the mobile terminal 10 deletes the storage completed screen SC17 and displays the image display screen SC16.

Here, types of the screens displayed in accordance with the print scan app 32 will be described with reference to FIG. 3. As shown in FIG. 3, the print scan app 32 displays plural types of screens including the home screen SC1 which is displayed first after the activation of the app, the screens SC2 to SC5 which are displayed after the selection of the print button BT1 in the home screen SC1, and the screens SC13 to SC17 which are displayed after the selection of the scan button BT2 in the home screen SC1. Below, each of the screens SC2 to SC5 will be called "print screen" and each of the screens SC13 to SC17 will be called "scan screen". Further, the print scan app 32 can display a screen other than the home screen, the print screens, and the scan screens, for example, an app setting screen (not shown) for inputting setting information (e.g., account information) of the print scan app 32.

Figure 4:
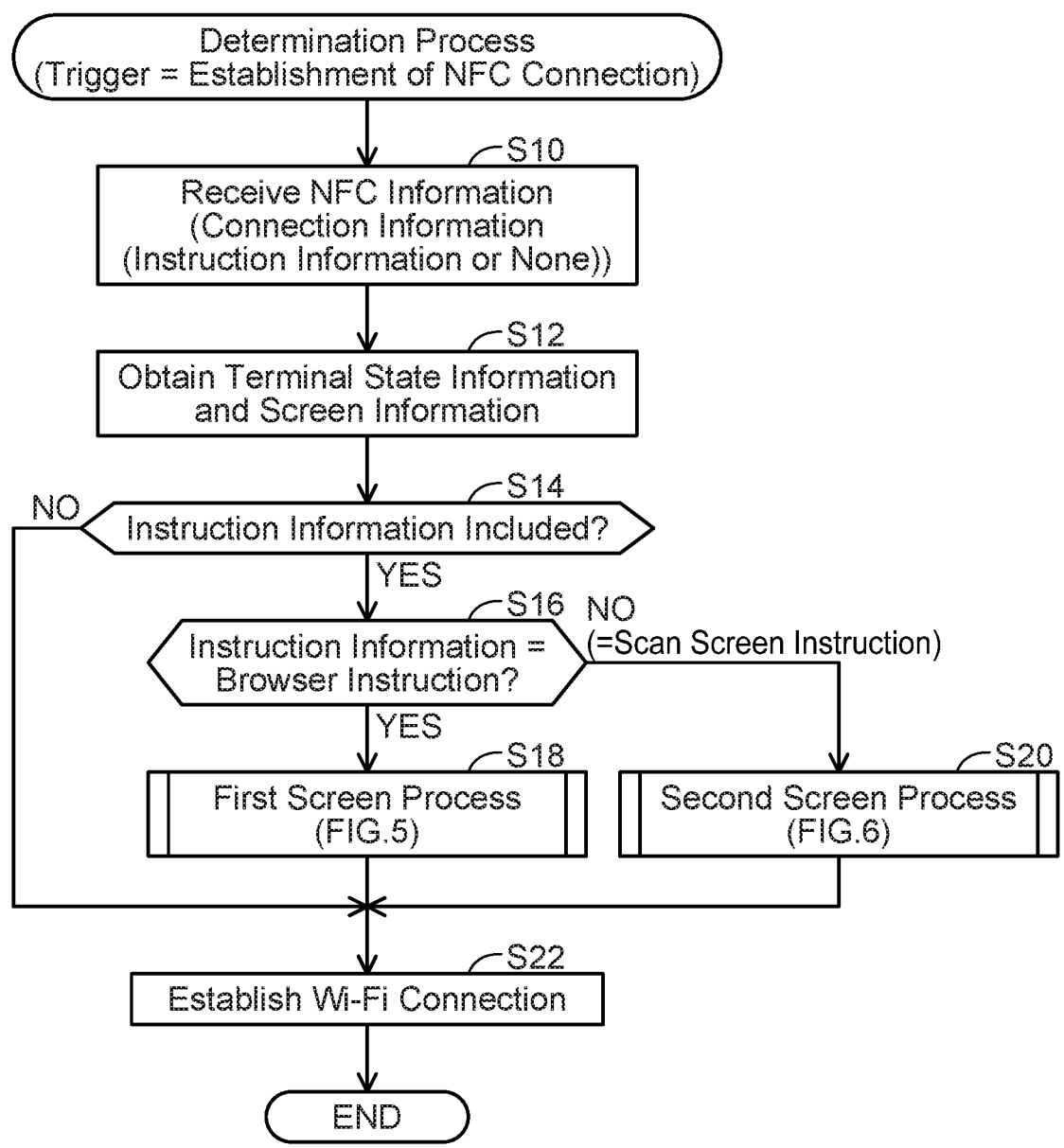
FIG. 4 shows a flowchart of a determination process of the mobile terminal.

(Determination Process; FIG. 4)

A determination process executed by the CPU 22 of the mobile terminal 10 in accordance with the print scan app 32 will be described with reference to FIG. 4. The determination process of FIG. 4 is started with the establishment of NFC connection with the MFP 100 as a trigger, and determines whether to display a screen according to instruction information that may be included in the NFC information.

In S10, the CPU 22 receives the NFC information from the NFC I/F 114 of the MFP 100 via the NFC I/F 14 by using the established NFC connection. As described above, the NFC information includes the connection information, however, it may not include instruction information. The process of T32 of FIG. 2 is realized by the process of S10.

In S12, the CPU 22 obtains the terminal state information 40 and the screen information 42 from the memory 24.

In S14, the CPU 22 determines whether or not the NFC information obtained in S10 includes instruction information. The CPU 22 proceeds to S16 in a case of determining that the NFC information includes instruction information (YES in S14), whereas it proceeds to S22 in a case of determining that the NFC information does not include instruction information (NO in S14). In S22, the CPU 22 establishes a Wi-Fi connection with the MFP 100 by using the connection information included in the received NFC information. Thereby, the process of T34 of FIG. 2 is realized.

In S16, the CPU 22 determines whether or not the instruction information included in the NFC information is the browser instruction. In a case of determining that the instruction information is the browser instruction (YES in S16), the CPU 22 executes a first screen process (see FIG. 5) in S18. On the other hand, in a case of determining that the instruction information is the scan screen instruction (NO in S16), the CPU 22 executes a second screen process (see FIG. 6) in S20. When the process of S18 or S20 ends, the CPU 22 proceeds to S22. When the process of S22 ends, the determination process of FIG. 4 ends.

Figure 5:
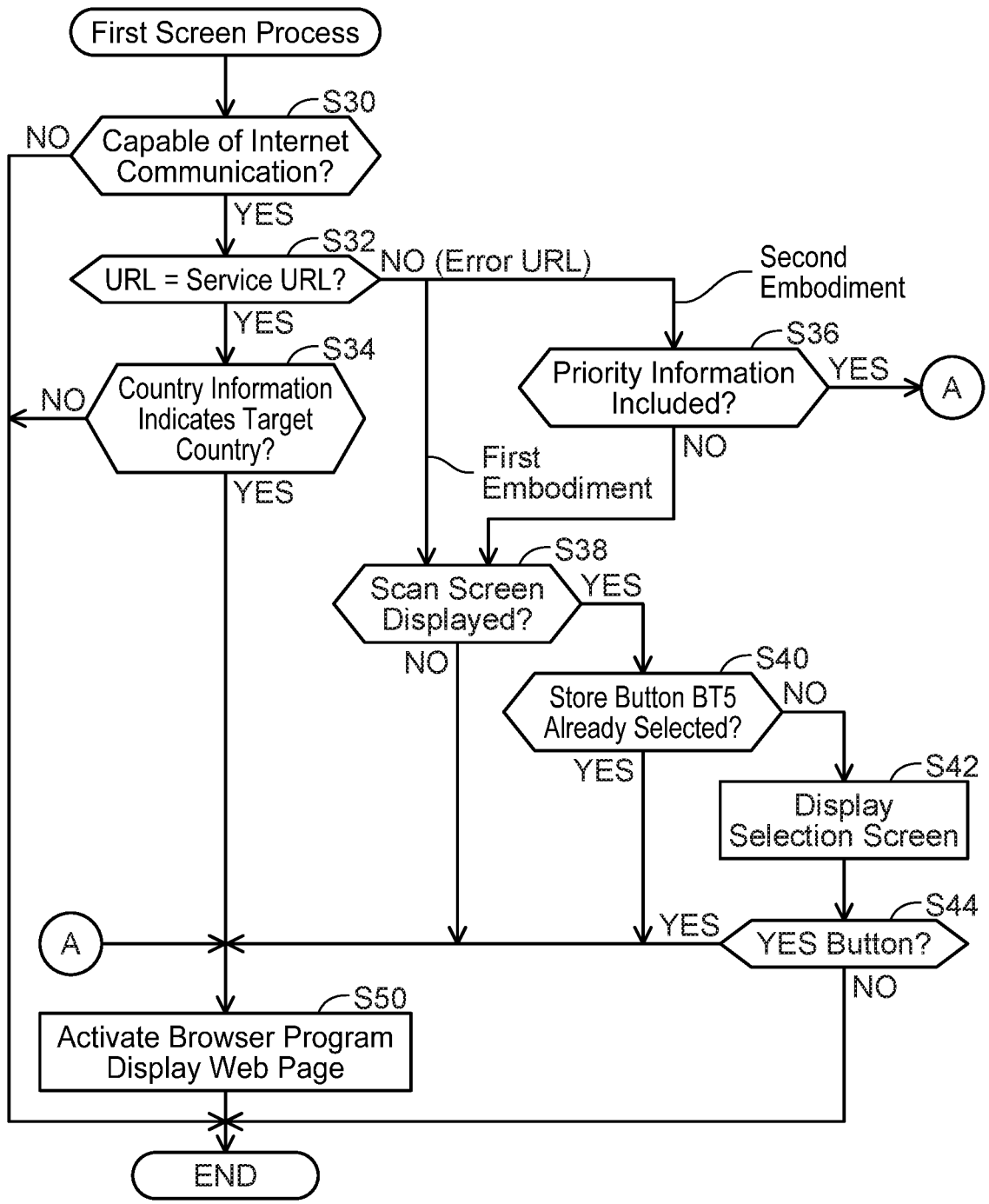
FIG. 5 shows a flowchart of a first screen process.

(First Screen Process; FIG. 5)

The first screen process will be described with reference to FIG. 5. In S30, the CPU 22 determines whether or not the mobile terminal 10 is capable of executing communication via the Internet. Specifically, the CPU 22 determines whether or not the communication state information included in the terminal state information obtained in S12 of FIG. 4 indicates that communication via the Internet can be executed. The CPU 22 proceeds to S32 in a case of determining that the communication state information indicates that communication via the Internet can be executed (YES in S30), whereas it skips processes from S32 onward and ends the process of FIG. 5 in a case of determining that the communication state information indicates that communication via the Internet cannot be executed (NO in S30).

In S32, the CPU 22 determines whether or not the service URL is included in the instruction information. In a case of determining that the service URL is included in the instruction information (YES in S32), the CPU 22 determines in S34 whether or not the country information included in the terminal state information obtained in S12 of FIG. 4 indicates a target country where the service server can provide a service to the user. The CPU 22 proceeds to S50 in a case of determining that the country information indicates the target country (YES in S34), whereas it skips S50 and ends the process of FIG. 5 in a case of determining that the country information does not indicate the target country (NO in S34). Thereby, it is possible to suppress display of a web page that is incompatible with the state where the country information indicating a country other than the target country is stored due to the country in which the user of the mobile terminal 10 lives being a country other than the target country.

In S50, the CPU 22 activates the web browser program 34 and supplies the service URL included in the instruction information to the web browser program 34. Thereby, the CPU 22 accesses the service server indicated by the service URL in accordance with the web browser program 34 and causes the display 12 to display a web page for services provided by the service server. When the process of S50 ends, the process of FIG. 5 ends.

In a case of determining that the error URL is included in the instruction information (NO in S32), the CPU 22 specifies in S38 a type of screen that is being displayed, by using the screen information obtained in S12 of FIG. 4. Then, by using the specified type of screen, the CPU 22 determines whether or not the screen which is being displayed is the scan screen. The CPU 22 proceeds to S50 in a case of determining that the screen which is being displayed is a screen other than the scan screen (e.g., the home screen, the print screen) (NO in S38). In S50 that is executed in the case of NO in S32, the CPU 22 supplies the error URL to the web browser program 34. Thereby, the CPU 22 accesses a support server indicated by the error URL in accordance with the web browser program 34 and causes the display 12 to display a web page indicating a solution for a paper jam.

In a case of determining that the screen which is being displayed is the scan screen (YES in S38), the CPU 22 determines in S40 whether or not selection of the Store button BT5 in the image display screen SC16 has been already accepted. The CPU 22 proceeds to S50 in a case of determining that selection of the Store button BT5 has been already accepted (YES in S40). The determination of YES is made in S40, for example, in a case where the screen which is being displayed is the image display screen SC16 which is displayed after the Store button BT5 in the image display screen SC16 has been selected.

The Store button BT5 having been selected means that storage of the scan data representing the target document has been completed. In such a situation, it is less necessary to maintain the displaying of the image display screen SC16 which is the scan screen. Taking such a situation into account, by executing the determination of S40, it is possible to cause the web page indicating a solution for the paper jam to be displayed in place of the image display screen SC16.

In a case of determining that selection of the Store button BT5 has not yet been accepted (NO in S40), the CPU 22 causes in S42 the display 12 to display a selection screen for allowing the user to select whether or not to display the web page. The selection screen includes a YES button for selecting that the web page is to be displayed and a NO button for selecting that the web page is not to be displayed.

In S44, the CPU 22 determines whether or not the YES button in the selection screen has been selected by the user. The CPU 22 proceeds to S50 in a case where the YES button in the selection screen has been selected by the user (YES in S44), whereas it skips S50 and ends the process of FIG. 5 in a case where the NO button in the selection screen has been selected by the user (NO in S44). Thereby, in the situation where the screen which is being displayed is the scan screen, it is possible to allow the user to select whether or not to display the web page indicating a solution for the printing paper jam.

Figure 6:
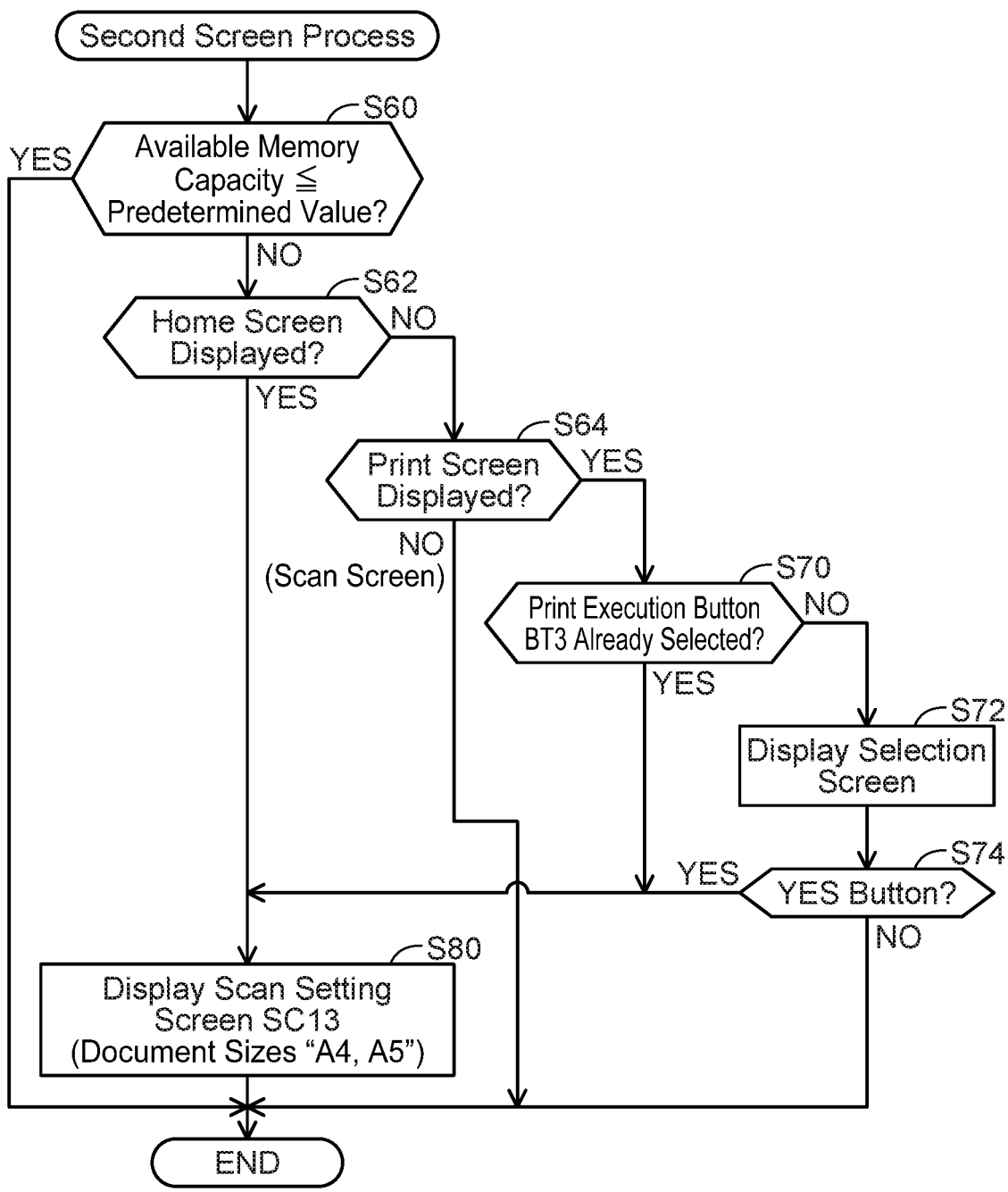
FIG. 6 shows a flowchart of a second screen process.

(Second Screen Process; FIG. 6)

The second screen process will be described with reference to FIG. 6. In S60, the CPU 22 determines, by using the available memory information included in the terminal state information obtained in S12 of FIG. 4, whether or not an available storage capacity of the memory 24 is equal to or below a predetermined value. The predetermined value is determined based on an available storage capacity for scan data. The CPU 22 proceeds to S62 in a case of determining that the available storage capacity of the memory 24 is greater than the predetermined value (NO in S60), whereas it skips processes from S62 onward and ends the process of FIG. 6 in a case of determining that the available storage capacity of the memory 24 is equal to or below the predetermined value (YES in S60). If a process of S80 (to be described later) is executed in the case where the available storage capacity of the memory 24 is equal to or below the predetermined value, the scan setting screen SC13 for accepting an operation to execute scanning is displayed despite the mobile terminal 10 being unable to store the scan data. That is, the scan setting screen SC13 is not compatible with the state where the available storage capacity of the memory 24 is equal to or below the predetermined value. According to the determination of S60, it is possible to suppress the display of the scan setting screen SC13 which is not compatible with the state where the available storage capacity of the memory 24 is equal to or below the predetermined value.

In S62, by using the screen information obtained in S12 of FIG. 4, the CPU 22 specifies a type of the screen which is being displayed and determines whether or not the screen which is being displayed is the home screen. The CPU 22 proceeds to S80 in a case of determining that the screen which is being displayed is the home screen (YES in S62). In S80, the CPU 22 causes the display 12 to display the scan setting screen SC13 according to the scan screen instruction included in the NFC information received in S10 of FIG. 4. In this case, the CPU 22 specifies document size(s) that the ADF of the MFP 100 is incapable of feeding (e.g., A3) by using the size information included in the scan screen instruction, and causes the display 12 to display the scan setting screen SC13 that includes document size(s) that the ADF of the MFP 100 is capable of feeding (e.g., A4, A5) and does not include the specified document size(s) that the ADF is incapable of feeding. When the process of S80 ends, the process of FIG. 6 ends.

In a case of determining that the screen which is being displayed is not the home screen (NO in S62), the CPU 22 determines in S64 whether or not the screen which is being displayed is the print screen. The CPU 22 skips S80 and ends the process of FIG. 6 in a case of determining that the screen which is being displayed is a screen other than the print screen (e.g., the scan screen) (NO in S64).

In a case of determining that the screen which is being displayed is the print screen (YES in S64), the CPU 22 determines in S70 whether or not selection of the print execution button BT3 in the preview screen SC4 has been already accepted. The CPU 22 proceeds to S80 in a case of determining that selection of the print execution button BT3 has been already accepted (YES in S70). The determination of YES is made in S70, for example, in a case where the screen which is being displayed is the preview screen SC4 which is displayed after the print execution button BT3 in the preview screen SC4 has been selected. Thereby, as in S40 of FIG. 5, the scan setting screen SC13 can be displayed taking into consideration the situation where printing of the target image has been completed.

In a case of determining that selection of the print execution button BT3 has not yet been accepted (NO in S70), the CPU 22 causes in S72 the display 12 to display a selection screen for allowing the user to select whether or not to display the scan setting screen SC13. As in the selection screen of S42 of FIG. 5, the selection screen of S72 includes a YES button and a NO button. S74 is the same as S44 of FIG. 5. The CPU 22 proceeds to S80 in a case where the YES button in the selection screen has been selected by the user (YES in S74), whereas it skips S80 and ends the process of FIG. 6 in a case where the NO button in the selection screen has been selected by the user (NO in S74).

Figure 7:
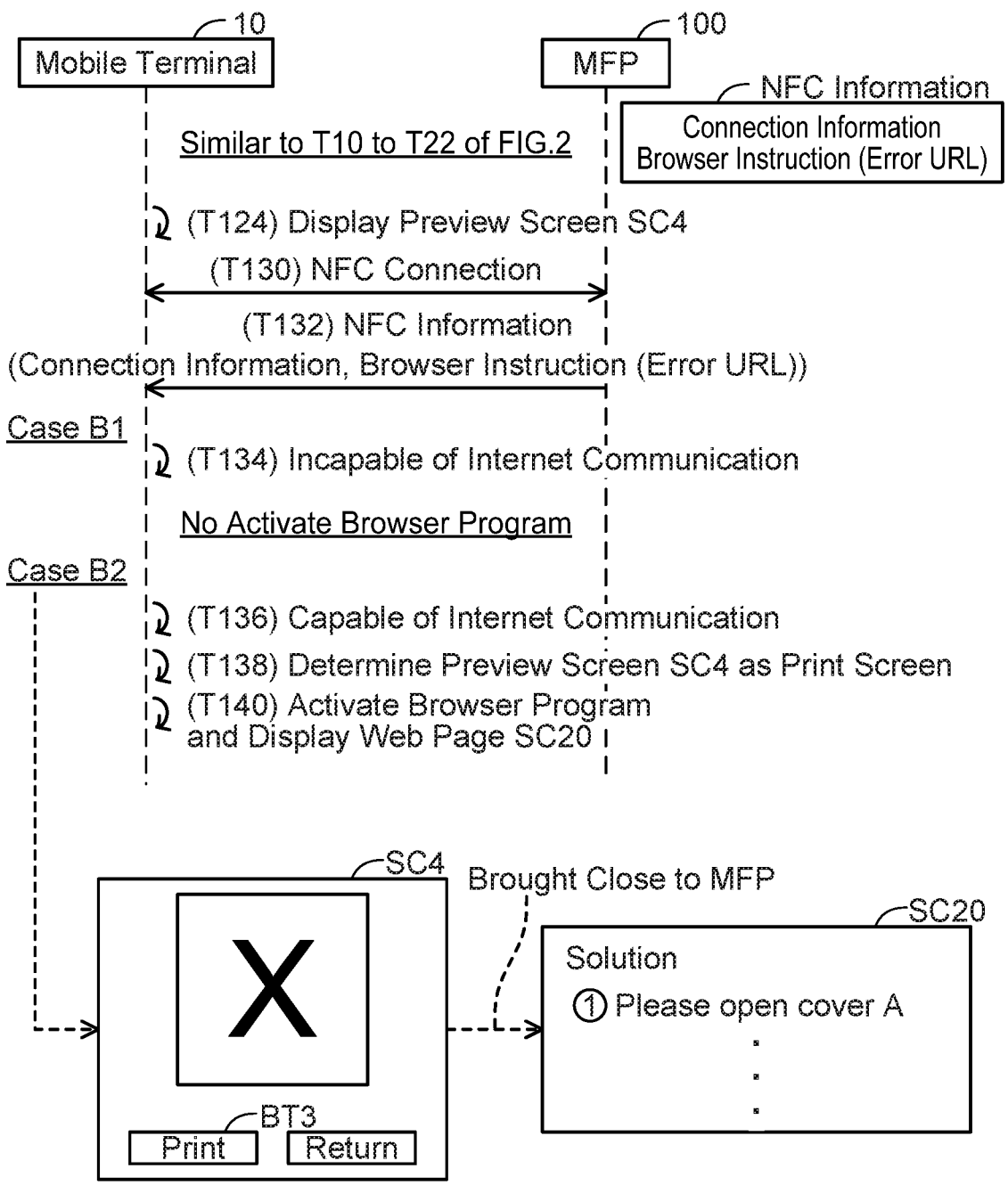
FIG. 7 shows a sequence diagram of specific cases B1, B2 of the first screen process.
Figure 8:
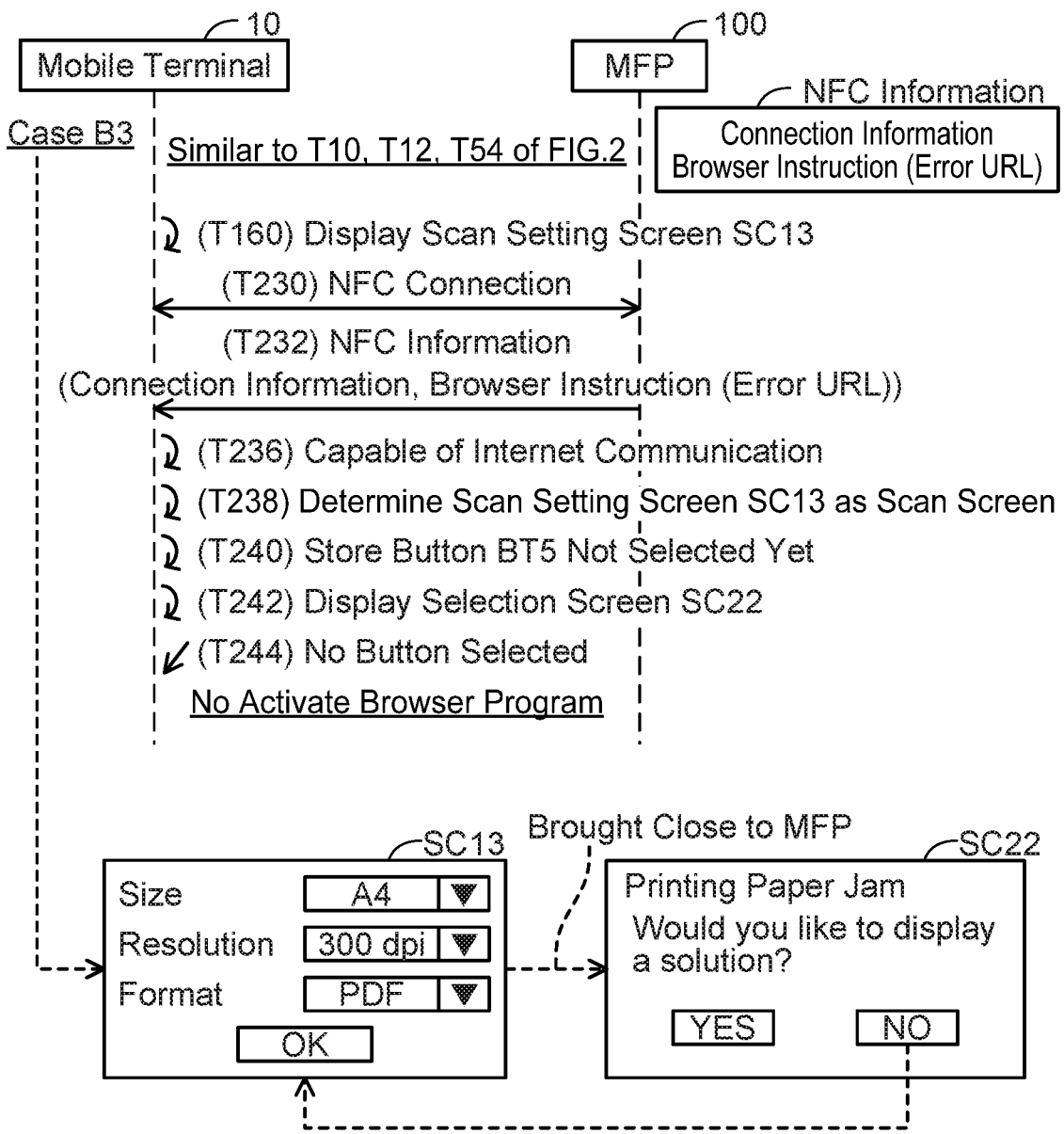
FIG. 8 shows a sequence diagram of a specific case B3 of the first screen process.

(Specific Examples of First Screen Process; FIG. 7, FIG. 8)

Specific cases realized by the first screen process of FIG. 5 will be described with reference to FIG. 7 and FIG. 8. In the cases of FIG. 7 and FIG. 8, the MFP 100 is in a state with a paper jam. Therefore, the NFC information includes the browser instruction including the error URL as the instruction information.

The mobile terminal 10 executes processes same as T10 to T22 of FIG. 2. In T124, the mobile terminal 10 causes the display 12 to display the preview screen SC4, as in T24 of FIG. 2. In each of the cases of FIG. 7, the user brings the mobile terminal 10 close to the MFP 100 in a situation where the preview screen SC4 is being displayed on the display 12. Thereby, as in T30 of FIG. 2, an NFC connection is established between the mobile terminal 10 and the MFP 100 in S130. T132 is the same as T32 of FIG. 2 excepting that the NFC information includes the browser instruction and the browser instruction includes the error URL. In response to receiving the NFC information from the MFP 100, the mobile terminal 10 obtains the terminal state information 40 and the screen information 42 from the memory 24 (S12 of FIG. 4) and executes the first screen process (S18) since the NFC information includes the browser instruction (YES in S16).

In case B1, the state of the Internet I/F 18 of the mobile terminal 10 is the incommunicable state. As a result, the mobile terminal 10 determines in T134 that the communication state information in the terminal state information 40 indicates that communication via the Internet cannot be executed (NO in S30 of FIG. 5). As a result, the mobile terminal 10 does not activate the web browser program 34 and the displaying of the preview screen SC4 is maintained.

According to case B1, in a case of receiving the browser instruction from the MFP 100 in the situation where the preview screen SC4 is being displayed (T132), the mobile terminal 10 uses the communication state information included in the terminal state information 40 to determine that the mobile terminal 10 is incapable of executing communication via the Internet (T134). In this case, the mobile terminal 10 determines that a web page SC20 is not to be displayed and thus does not activate the web browser program 34. That is, in the case where the browser instruction is received from the MFP 100, it is possible to suppress activation of the web browser program 34 in the situation where communication via the Internet cannot be executed.

Further, in the present case, in the case where communication via the Internet cannot be executed, the web browser program 34 is not activated and therefore the web page SC20 is not displayed. Thereby, if the mobile terminal 10 is incapable of executing communication via the Internet in the case of receiving the browser instruction from the MFP 100, it is possible to suppress the display of the web page SC20 which is not compatible with the state of the mobile terminal 10.

In case B2, the state of the Internet I/F 18 of the mobile terminal 10 is the communicable state. As a result, the mobile terminal 10 determines in T136 that the communication state information in the terminal state information 40 indicates that communication via the Internet can be executed (YES in S30 of FIG. 5). In T138, the mobile terminal 10 determines that the error URL is included in the instruction information (YES in S32) and determines that the preview screen SC4 which is being displayed is the print screen (NO in S38). In T140, the mobile terminal 10 activates the web browser program 34, uses the web browser program 34 to access the support server indicated by the error URL, and displays the web page SC20 indicating a solution for the printing paper jam. Thereby, the user can be informed of the solution for the printing paper jam. The web page SC20 overlaps the preview screen SC4. Therefore, the preview screen SC4 cannot be seen while the web page SC20 is being displayed.

According to case B2, the mobile terminal 10 determines that the preview screen SC4 which is being displayed is the print screen (T138) and displays the web page SC20 indicating a solution for the printing paper jam (T140). That is, in the case where the browser instruction is received from the MFP 100, it is possible to appropriately display the web page SC20 which is compatible with the state where the mobile terminal 10 is displaying the print screen, that is, a state where the mobile terminal 10 is accepting an operation for executing printing.

(Case B3 of FIG. 8)

In case B3, the mobile terminal 10 executes processes same as T10, T12, T54 of FIG. 2. In the present case, the user brings the mobile terminal 10 close to the MFP 100 in a situation where the scan setting screen SC13 is being displayed on the display 12 (T160). T230, T232 are the same as T130, T132 of FIG. 7. As a result, the mobile terminal 10 executes the first screen process (S18 of FIG. 4).

T236 is the same as T136 of FIG. 7. In T238, the mobile terminal 10 determines that the error URL is included in the instruction information (YES in S32 of FIG. 4) and determines, by using the screen information 42, that the scan setting screen SC13 which is being displayed is the scan screen (YES in S38). Since the image display screen SC16 has not been displayed yet in the present case, the mobile terminal 10 determines in T240 that selection of the Store button BT5 has not yet been accepted (NO in S40). In T242, the mobile terminal 10 displays a selection screen SC22 (S42). In T244, the mobile terminal 10 accepts selection of a NO button in the selection screen SC22 (NO in S44). As a result, the mobile terminal 10 does not activate the web browser program 34 and the displaying of the scan setting screen SC13 is maintained.

Figure 9:
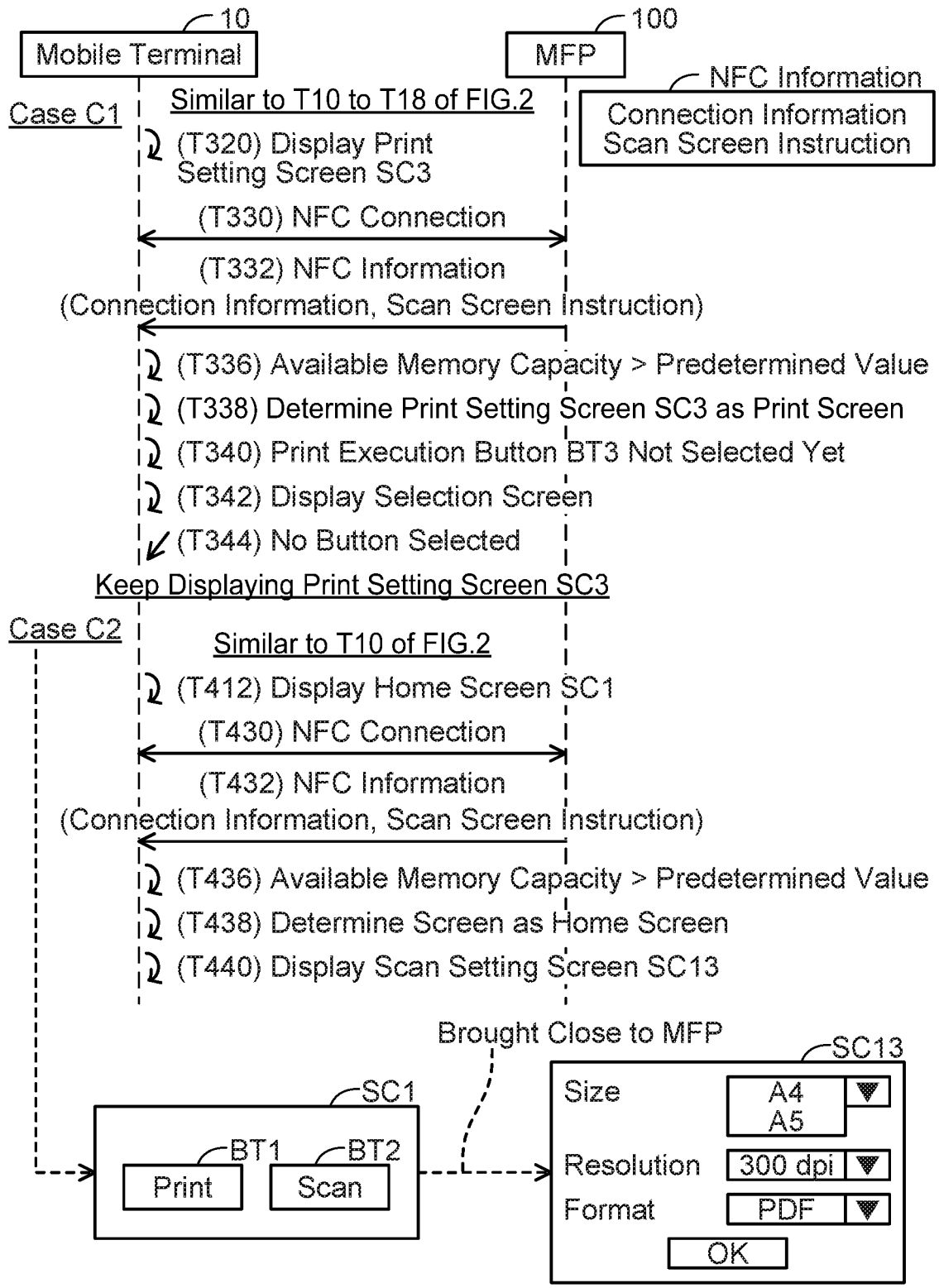
FIG. 9 shows a sequence diagram of specific cases C1, C2 of the second screen process.

According to the present case, in the case of determining that the scan setting screen SC13 which is being displayed is the scan screen (T238), the mobile terminal 10 does not display the web page SC20 indicating a solution for the printing paper jam (i.e., a web page related to printing). The state where the scan setting screen SC13 is being displayed is a state where the mobile terminal 10 is accepting an operation for executing scanning That is, in the case where the browser instruction is received from the MFP 100, it is possible to suppress the display of the web page SC20 which is related to printing and is not compatible with the state where the mobile terminal 10 is accepting an operation for executing scanning (Specific Examples of Second Screen Process; FIG. 9)

Specific cases realized by the second screen process of FIG. 6 will be described with reference to FIG. 9. In each of the cases of FIG. 9, the MFP 100 is in a state with a document placed on the ADF. Therefore, the NFC information includes the scan screen instruction as the instruction information. Further, in the present cases, the available storage capacity of the memory 24 is greater than the predetermined value.

In case C1, the mobile terminal 10 executes processes same as T10 to T18 of FIG. 2. In T320, the mobile terminal 10 causes the display 12 to display the print setting screen SC3, as in T20 of FIG. 2. In the present case, the user brings the mobile terminal 10 close to the MFP 100 in a situation where the print setting screen SC3 is being displayed on the display 12. T330 is the same as T30 of FIG. 2. T332 is the same as T32 of FIG. 2 excepting that the NFC information includes the scan screen instruction. In response to receiving the NFC information from the MFP 100, the mobile terminal 10 obtains the terminal state information 40 and the screen information 42 from the memory 24 (S12 of FIG. 4) and executes the second screen process (S20) since the NFC information includes the scan screen instruction (NO in S16).

In T336, the mobile terminal 10 determines that the available storage capacity of the memory 24 is greater than the predetermined value by using the available memory information in the terminal state information 40 (NO in S60 of FIG. 6). In T338, the mobile terminal 10 uses the screen information 42 to determine that the print setting screen SC3 which is being displayed is the print screen (NO in S62, YES in S64). Since the preview screen SC4 has not been displayed yet in the present case, the mobile terminal 10 determines in T340 that selection of the print execution button BT3 has not yet been accepted (NO in S70). In T342, the mobile terminal 10 displays the selection screen (S72). In T344, the mobile terminal 10 accepts selection of the NO button in the selection screen (NO in S74). As a result, the mobile terminal 10 does not display the scan setting screen SC13 and the displaying of the print setting screen SC3 is maintained.

According to the present case, in the case of determining that the print setting screen SC3 which is being displayed is the print screen (T338), the mobile terminal 10 does not display the scan setting screen SC13. The state where the print setting screen SC3 is being displayed is a state where the mobile terminal 10 is accepting an operation for executing printing. That is, in the case where the scan screen instruction is received from the MFP 100, it is possible to suppress the display of the scan setting screen SC13 which is incompatible with the state where the mobile terminal 10 is accepting an operation for executing printing.

In case C2, the mobile terminal 10 executes process same as T10 of FIG. 2. In T412, the mobile terminal 10 causes the display 12 to display the home screen SC1, as in T12 of FIG. 2. In the present case, the user brings the mobile terminal 10 close to the MFP 100 in a situation where the home screen SC1 is being displayed on the display 12. T430 to T436 are the same as T330 to T336. In T438, the mobile terminal 10 uses the screen information 42 to determine that the screen which is being displayed is the home screen SC1 (YES in S62). In T440, the mobile terminal 10 displays the scan setting screen SC13 (S80) in place of the home screen SC1 (i.e., by deleting the home screen SC1). As shown in FIG. 9, the scan setting screen SC13 includes the document sizes "A4", "A5" that the ADF of the MFP 100 is capable of feeding and does not include the document size "A3" that the ADF of the MFP 100 is incapable of feeding. Thereby, in the state where the document is placed on the ADF, it is possible to suppress sending of a scan request that includes scan setting information including the document size "A3" that the ADF of the MFP 100 is incapable of feeding to the MFP 100.

According to the present case, the mobile terminal 10 determines that the screen which is being displayed is the home screen SC1 (T438) and displays the scan setting screen SC13 (T440). That is, in the case where the scan screen instruction is received from the MFP 100, it is possible to appropriately display the scan setting screen SC13 which is compatible with the state where the mobile terminal 10 is displaying the home screen SC1, i.e., a state where the mobile terminal 10 can accept an operation for executing scanning.

(Correspondence Relationships)

The print scan app 32 and the MFP 100 are examples of "computer-readable instructions" and "communication device", respectively. Any screen of the screens SC1 to SC17 of FIG. 3 is an example of "first screen". The terminal state information 40 and the screen information 42 are examples of "state information". In the case of the first screen process of FIG. 5, the home screen or the print screen is an example of "first type of screen", the scan screen is an example of "second type of screen", and selection of the Store button BT5 is an example of "execution instruction". In the case of the second screen process of FIG. 6, the home screen is an example of "first type of screen", the print screen is an example of "second type of screen", and selection of the print execution button BT3 is an example of "execution instruction". The web page SC20 of FIG. 7 or the scan setting screen SC13 of FIG. 9 is an example of "second screen". The ADF is an example of "auto document feeder".

S10 and S12 of FIG. 4 are examples of "obtain instruction information" and "obtain state information", respectively. S30, S34, S38 of FIG. 5, S60 or S62 of FIG. 6 is an example of "determine whether the different screen is to be displayed". S50 of FIG. 5 or S80 of FIG. 6 is an example of "cause the display to display the different screen".

Second Embodiment

In the present embodiment, the NFC information in the NFC I/F 114 may include priority information. The priority information is information indicating that the web page SC20 indicating a solution for printing paper jam is to be displayed preferentially. In a case where the MFP 100 accepts an instruction to preferentially display the web page SC20 from the user, the priority information is stored in the NFC I/F 114.

(First Screen Process; FIG. 5)

A first image process of the present embodiment is the same as that of the first embodiment excepting that a process of S36 is executed.

In the case of determining that the error URL is included in the instruction information (NO in S32), the CPU 22 determines in S36 whether the priority information is included in the instruction information. The CPU 22 proceeds to S50 in a case of determining that the priority information is included in the instruction information (YES in S36), whereas it proceeds to S38 in a case of determining that the priority information is not included in the instruction information (NO in S36).

According to the present embodiment, in the case of determining that the priority information is received together with the browser instruction from the MFP 100 (YES in S36), the mobile terminal 10 displays the web page SC20 (S50) without executing the processes from S38 onward. Thereby, in the case where the priority information is received from the MFP 100, the display of the web page SC20 can be prioritized without executing the determination using the terminal state information 40 and the screen information 42.

(Variant 1) "Communication device" may not be the MFP 100, but may be, for example, a stationary PC (abbreviation of Personal Computer), a notebook PC, or another mobile terminal different from the mobile terminal 10.

(Variant 2) In T140 of FIG. 7, the web page SC20 is displayed overlapping with the preview screen SC4. Instead, the web page SC20 and the preview screen SC4 may be displayed side by side. In the present variant, a screen including the web page SC20 and the preview screen SC4 is an example of "different screen".

(Variant 3) The screens SC2 to SC5 of FIG. 3 are merely examples of the print screens. For example, the print screens may not include the image selection screen SC2, but may include the screens SC3 to SC5. In this case, in S62 of FIG. 6, the mobile terminal 10 may determine whether the screen which is being displayed is the home screen SC1 or the image selection screen SC2. Then, in a case of determining that the screen which is being displayed is, for example, the image selection screen SC2, the mobile terminal 10 may display the scan setting screen SC13. In the present variant, the home screen SC1 or the image selection screen SC2 is an example of "first type of screen". Further, the screens SC13 to SC17 of FIG. 3 are merely examples of the scan screens. For example, the scan screens may not include the scan setting screen SC13, but may include the screens SC14 to SC17.

(Variant 4) In the second screen process of FIG. 6, S80 is skipped in the case where it is determined that the screen which is being displayed is the scan screen (NO in S64). Instead, S80 may be executed in the case where it is determined that the screen which is being displayed is the scan screen. In the present variant, the home screen or the scan screen is an example of "first type of screen".

(Variant 5) The MFP 100 may be capable of executing a FAX function in addition to the print function and the scan function. Then, in accordance with the print scan app 32, the mobile terminal 10 may display a FAX screen for using the FAX function. In this case, in S38 of FIG. 5, the mobile terminal 10 may determine whether or not the screen which is being displayed is the FAX screen. Then, the mobile terminal 10 may skip S50 in a case of determining that the screen which is being displayed is the FAX screen. In the present variant, the FAX function and the FAX screen are examples of "different function" and "second type of screen", respectively.

(Variant 6) In the second screen process of FIG. 6, the mobile terminal 10 may determine whether or not the screen which is being displayed is an app setting screen. Then, the mobile terminal 10 may execute the process of S80 in a case of determining that the screen which is being displayed is the app setting screen. In the present variant, the app setting screen is an example of "first type of screen". Further, in another example, the mobile terminal 10 may skip S80 in the case of determining that the screen which is being displayed is the app setting screen. In this variant, the app setting screen is an example of "second type of screen".

(Variant 7) In the first screen process of FIG. 5, the mobile terminal 10 determines whether or not selection of the Store button BT5 in the image display screen SC16 has been already accepted (S40). Instead, the mobile terminal 10 may determine whether or not selection of the scan execution button BT4 in the setting confirmation screen SC14 has been already accepted. In the present variant, selection of the scan execution button BT4 is an example of "execution instruction".

(Variant 8) The process of S40 of FIG. 5 and the process of S70 of FIG. 6 may not be executed. In the present variant, "determine whether an execution instruction for the different function has been already accepted" may be omitted.

(Variant 9) In the embodiments described above, in T440 of FIG. 9, the mobile terminal 10 displays the scan setting screen SC13 that does not include the document size "A3" that the ADF of the MFP 100 is incapable of feeding. Instead, the mobile terminal 10 may display the scan setting screen SC13 that includes the document size "A3" below the document sizes "A4", "A5" that the ADF of the MFP 100 is capable of feeding. Generally speaking, in the second screen, one or more document sizes among the plural document sizes are simply need to be displayed preferentially compared to the document size that the auto document feeder is incapable of feeding.

(Variant 10) In the embodiments described above, the scan screen instruction includes the size information. Instead, the scan screen instruction may not include the size information, and the MFP 100 may display, in S80 of FIG. 6, the scan setting screen SC13 including all the document sizes that the MFP 100 is capable of scanning (e.g., the scan setting screen SC13 of FIG. 3). Generally speaking, in the second screen, all the plural document sizes may be displayed.

(Variant 11) The process of S30 of FIG. 5 may not be executed. In the present variant, "communication state information" may not be used to "determine whether the different screen is to be displayed".

(Variant 12) The process of S42 of FIG. 5 and the process of S72 of FIG. 6 may not be executed. In the present variant, "cause the display to display a selection screen" may be omitted.

(Variant 13) In the embodiments described above, the mobile terminal 10 obtains the instruction information from the MFP 100 via the NFC I/F 14 (S10 of FIG. 4). Instead, the mobile terminal 10 may obtain the instruction information from the MFP 100 via an I/F other than the NFC I/F 14, for example, via an I/F for executing wireless communication according to another communication scheme such as BlueTooth (registered trademark), infrared, transfer jet, or the like. Further, the mobile terminal 10 may capture a QR code (registered trademark) displayed on a screen of the MFP 100 and obtain the instruction information encoded by the QR code. In the present variant, obtaining the instruction information via the I/F other than the NFC I/F 14 and obtaining the instruction information by capturing the QR code are examples of processes realized by "obtain instruction information".

(Variant 14) In S60 of FIG. 6, the mobile terminal 10 may determine whether or not the battery remaining amount is equal to or below a predetermined value by using the battery remaining amount information included in the terminal state information. In the present variant, determining whether the battery remaining amount is equal to or below the predetermined value is an example of a process realized by "determine whether the different screen is to be displayed".

(Variant 15) In the embodiments described above, the processes of FIG. 2 to FIG. 9 are realized by the CPU 22 of the mobile terminal 10 executing the print scan app 32 and the like (i.e., by software). Instead, at least one of the processes may be realized by hardware such as a logic circuit and the like.

What is claimed is:

1. A non-transitory computer-readable medium storing computer-readable instructions for a mobile terminal,
    the computer-readable instructions, when executed by a processor of the mobile terminal, causing the mobile terminal to:
    obtain instruction information from a communication device in a situation where a first screen is displayed on a display of the mobile terminal, the instruction information indicating an instruction for causing the display to display a different screen from the first screen;
    obtain state information indicating a state of the mobile terminal in a case where the instruction information is obtained;
    determine, by using the state information, whether the different screen is to be displayed in place of the first screen; and
    in a case where it is determined that the different screen is to be displayed, cause the display to display the different screen in place of the first screen, wherein in a case where it is determined that the different screen is not to be displayed, displaying of the first screen is maintained.

2. The non-transitory computer-readable medium as in claim 1, wherein
    the state information includes screen information for specifying a type of the first screen which is being displayed on the display,
    it is determined that the different screen is to be displayed in a case where the first screen is specified, by using the screen information, as a first type of screen among plural types of screens that are displayable according to the computer-readable instructions, and
    it is determined that the different screen is not to be displayed in a case where the first screen is specified, by using the screen information, as a second type of screen among the plural types of screens, the second type of screen being different from the first type of screen.

3. The non-transitory computer-readable medium as in claim 2, wherein
    the communication device is a multifunction peripheral capable of executing a plurality of functions including a specific function,
    the instruction information indicates an instruction for causing the display to display a second screen different from the first screen, the second screen being related to the specific function,
    it is determined that the second screen is to be displayed in a case where the first screen is specified, by using the screen information, as the first type of screen that is related to the specific function, and
    it is determined that the second screen is not to be displayed in a case where the first screen is specified, by using the screen information, as the second type of screen that is related to a different function from the specific function among the plurality of functions.

4. The non-transitory computer-readable medium as in claim 3, wherein
    the computer-readable instructions, when executed by the processor, further cause the mobile terminal to:
    in a case where the first screen is specified as the second type of screen, determine whether an execution instruction for the different function has been already accepted; and
    in a case where it is determined that the execution instruction for the different function has already been accepted, cause the display to display the second screen in place of the first screen, and
    it is determined that the second screen is not to be displayed in a case where the first screen is specified as the second type of screen and it is determined that the execution instruction for the different function has not been accepted.

5. The non-transitory computer-readable medium as in claim 3, wherein
    the specific function is a print function or a scan function.

6. The non-transitory computer-readable medium as in claim 5, wherein
    the specific function is the scan function capable of scanning plural document sizes,
    the second screen is a screen for allowing a user to select a scan setting,
    the instruction information indicates the instruction for causing the display to display the second screen when a document is provided on an auto document feeder, and
    in the second screen, one or more document sizes, that the auto document feeder is capable of feeding, among the plural document sizes are displayed preferentially compared to a document size that the auto document feeder is incapable of feeding.

7. The non-transitory computer-readable medium as in claim 1, wherein
    the state information includes communication state information indicating whether the mobile terminal is capable of executing communication via the Internet,
    it is determined that the different screen is to be displayed in a case where the communication state information indicates that the mobile terminal is capable of executing the communication via the Internet,
    it is determined that the different screen is not to be displayed in a case where the communication state information indicates that the mobile terminal is incapable of executing the communication via the Internet, in the case where it is determined that the different screen is to be displayed, a web browser program stored in the mobile terminal is used to cause the display to display the different screen in place of the first screen, and in the case where it is determined that the different screen is not to be displayed, the web browser program is not used.

8. The non-transitory computer-readable medium as in claim 1, wherein the computer-readable instructions, when executed by the processor, further cause the mobile terminal to:

cause the display to display a selection screen in the case where it is determined that the different screen is not to be displayed, the selection screen being a screen for allowing a user to select whether the different screen is to be displayed; and in a case where it is selected by the user in the selection screen that the different screen is to be displayed, cause the display to display the second screen in place of the first screen, and the displaying of the first screen is maintained in a case where it is not selected by the user in the selection screen that the different screen is to be displayed.

9. The non-transitory computer-readable medium as in claim 1, wherein the computer-readable instructions, when executed by the processor, further cause the mobile terminal to:

determine whether priority information is obtained from the communication device together with the instruction information, the priority information indicating that the different screen is to be displayed preferentially, in a case where it is determined that the priority information is obtained from the communication device together with the instruction information, the display is caused to display the different screen in place of the first screen without the determination whether the different screen is to be displayed in place of the first screen by using the state information.

10. A mobile terminal comprising:

a processor; and a memory storing computer-readable instructions therein, wherein the computer-readable instructions, when executed by the processor, cause the mobile terminal to:

obtain instruction information from a communication device in a situation where a first screen is displayed on a display of the mobile terminal, the instruction information indicating an instruction for causing the display to display a different screen from the first screen;

obtain state information indicating a current state of the mobile terminal in a case where the instruction information is obtained;

determine, by using the state information, whether the different screen is to be displayed in place of the first screen; and in a case where it is determined that the different screen is to be displayed, cause the display to display the different screen in place of the first screen, wherein in a case where it is determined that the different screen is not to be displayed, displaying of the first screen is maintained.

* * * * *